US010043013B1

(12) United States Patent
Ferrie et al.

(10) Patent No.: US 10,043,013 B1
(45) Date of Patent: Aug. 7, 2018

(54) SYSTEMS AND METHODS FOR DETECTING GADGETS ON COMPUTING DEVICES

(71) Applicant: Symantec Corporation, Mountain View, CA (US)

(72) Inventors: Peter Ferrie, Los Angeles, CA (US); Joseph Chen, Los Angeles, CA (US)

(73) Assignee: Symantec Corporation, Mountain View, CA (US)

( * ) Notice: Subject to any disclaimer, the term of this patent is extended or adjusted under 35 U.S.C. 154(b) by 216 days.

(21) Appl. No.: 15/260,961

(22) Filed: Sep. 9, 2016

(51) Int. Cl.
*G06F 21/00* (2013.01)
*G06F 21/57* (2013.01)
*G06F 21/55* (2013.01)

(52) U.S. Cl.
CPC .......... *G06F 21/577* (2013.01); *G06F 21/552* (2013.01); *G06F 2221/034* (2013.01)

(58) Field of Classification Search
CPC ...... G06F 21/554; G06F 21/52; G06F 21/577; G06F 21/566; G06F 2221/034
USPC .......................................................... 726/23
See application file for complete search history.

(56) References Cited

U.S. PATENT DOCUMENTS

| 8,171,256 | B1 * | 5/2012 | Satish | G06F 21/52 711/163 |
| 9,058,492 | B1 * | 6/2015 | Satish | G06F 21/50 |
| 2008/0016314 | A1 * | 1/2008 | Li | G06F 21/554 711/200 |
| 2008/0028180 | A1 * | 1/2008 | Newman | G06F 12/1416 711/206 |
| 2009/0183261 | A1 * | 7/2009 | Peinado | G06F 21/565 726/24 |
| 2011/0145472 | A1 * | 6/2011 | Whitehouse | G06F 8/65 711/103 |
| 2013/0091318 | A1 * | 4/2013 | Bhattacharjee | G06F 12/1475 711/6 |
| 2013/0111587 | A1 * | 5/2013 | Goel | G06F 21/577 726/23 |

(Continued)

OTHER PUBLICATIONS

Roglia, Giampaolo Fresi, et al. "Surgically returning to randomized lib (c)." Computer Security Applications Conference, 2009. ACSAC'09. Annual. IEEE, 2009.*

(Continued)

*Primary Examiner* — Syed Zaidi
(74) *Attorney, Agent, or Firm* — FisherBroyles, LLP

(57) ABSTRACT

The disclosed computer-implemented method for detecting gadgets on computing devices may include (i) identifying, on a computing device, a process containing multiple modules, (ii) identifying, within the process, each module that does not implement a security protocol that randomizes, each time the module executes, a memory location of at least one portion of data accessed by the module, (iii) copying each module that does not implement the security protocol to a section of memory dedicated to security analyses, (iv) determining, based on detecting at least one gadget-specific characteristic within at least one copied module, that the process contains a gadget that is capable of being maliciously exploited, and then (v) performing a security action on the computing device to prevent the gadget from being maliciously exploited. Various other methods, systems, and computer-readable media are also disclosed.

20 Claims, 6 Drawing Sheets

(56) References Cited

U.S. PATENT DOCUMENTS

| | | | | |
|---|---|---|---|---|
| 2014/0020092 | A1* | 1/2014 | Davidov | G06F 21/54 726/22 |
| 2014/0082329 | A1* | 3/2014 | Ghose | G06F 9/3877 712/208 |
| 2015/0161385 | A1* | 6/2015 | Gounares | G06F 21/54 726/25 |
| 2016/0042177 | A1* | 2/2016 | Ben-Haim | G06F 21/54 726/22 |
| 2016/0044057 | A1* | 2/2016 | Chenette | H04L 63/1433 726/1 |
| 2016/0375663 | A1* | 12/2016 | Lv | E04G 11/06 428/99 |

OTHER PUBLICATIONS

Newsome, James, and Dawn Song. "Dynamic taint analysis for automatic detection, analysis, and signature generation of exploits on commodity software." (2005).*

Address Space Layout Randomization; https://en.wikipedia.org/wiki/Address_space_layout_randomization; as accessed on Jul. 20, 2016; Jul. 20, 2016.

PE 101; A Windows Executable Walkthrough; http://sampsonchen.com/2013/03/05/pe-101-a-windows-executable-walkthrough/; as accessed on Jul. 20, 2016; Mar. 5, 2013.

Gadget; https://en.wikipedia.org/wiki/Gadget_(computer_science); as accessed on Jul. 20, 2016; Jun. 8, 2015.

Web widget; https://en.wikipedia.org/wiki/Web_widget; as accessed on Jul. 20, 2016; Aug. 20, 2016.

Disable ASLR; http://www.rohitab.com/discuss/topic/40268-disable-aslr/; as accessed on Jul. 20, 2016; Aug. 7, 2013.

* cited by examiner

SYSTEMS AND METHODS FOR DETECTING GADGETS ON COMPUTING DEVICES

BACKGROUND

Gadgets (and related applications, such as widgets) may allow users to personalize, customize and enhance their computing devices, software applications, and/or webpages. For example, a user may add, to the home screen of their mobile phone, one or more gadgets that display interactive elements such as animated clocks or graphics with updated weather information. In addition, application and web developers may utilize gadgets to supplement the design and increase the attractiveness of their products.

Unfortunately, gadgets may be vulnerable to attacks that allow external parties to hijack or control computing devices running the gadgets. For example, processes that run gadgets may contain inherent security deficiencies that enable local and/or remote exploits (via, e.g., injections of shellcode). These exploits may result in security breaches such as the unauthorized distribution of sensitive data and/or a user's loss of control of a computing device. Traditional security systems that protect computing devices from maliciously-exploited gadgets may attempt to identify and/or terminate processes that contain gadgets. However, these conventional systems may require extensive time and computing resources to determine whether a process is a gadget. The instant disclosure, therefore, identifies and addresses a need for improved systems and methods for detecting and preventing gadgets from being maliciously exploited.

SUMMARY

As will be described in greater detail below, the instant disclosure describes various systems and methods for detecting and preventing gadgets from being maliciously exploited. In one example, a method for performing such a task may include (i) identifying, on a computing device, a process containing multiple modules, (ii) identifying, within the process, each module that does not implement a security protocol that randomizes, each time the module executes, a memory location of at least one portion of data accessed by the module, (iii) copying each module that does not implement the security protocol to a section of memory dedicated to security analyses, (iv) determining, based on detecting at least one gadget-specific characteristic within at least one copied module, that the process contains a gadget that is capable of being maliciously exploited, and then (v) performing a security action on the computing device to prevent the gadget from being maliciously exploited.

In some examples, identifying the process on the computing device may include identifying a process currently running on the computing device. In addition, in some embodiments, the section of memory dedicated to security analyses may include a dedicated section of memory within the computing device.

In some examples, identifying each module that does not implement the security protocol may include identifying each module that does not implement Address Space Layout Randomization (ASLR). In particular, the method may include identifying each module that does not contain, within a header of the module, a predetermined value that indicates the module implements ASLR.

In some embodiments, detecting the gadget-specific characteristic within the copied module may include determining that the module contains executable instructions. In such embodiments, determining that the process contains the gadget may include determining that the copied module both does not implement the security protocol and contains the executable instructions.

In some examples, performing the security action on the computing device may include terminating the process. In other examples, performing the security action may include monitoring the gadget while the gadget runs on the computing device to detect an indication that the gadget is being maliciously exploited.

In one embodiment, a system for implementing the above-described method may include several modules stored in memory, including (i) an identification module that (a) identifies, on a computing device, a process containing multiple modules and (b) identifies, within the process, each module that does not implement a security protocol that randomizes, each time the module executes, a memory location of at least one portion of data accessed by the module, (ii) a copying module that copies each module that does not implement the security protocol to a section of memory dedicated to security analyses, (iii) a determination module that determines, based on detecting at least one gadget-specific characteristic within at least one copied module, that the process contains a gadget that is capable of being maliciously exploited, and (iv) a security module that performs a security action on the computing device to prevent the gadget from being maliciously exploited. In addition, the system may include at least one physical processor configured to execute the identification module, the copying module, the determination module, and the security module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) identify, on a computing device, a process containing multiple modules, (ii) identify, within the process, each module that does not implement a security protocol that randomizes, each time the module executes, a memory location of at least one portion of data accessed by the module, (iii) copy each module that does not implement the security protocol to a section of memory dedicated to security analyses, (iv) determine, based on detecting at least one gadget-specific characteristic within at least one copied module, that the process contains a gadget that is capable of being maliciously exploited, and then (v) perform a security action on the computing device to prevent the gadget from being maliciously exploited.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
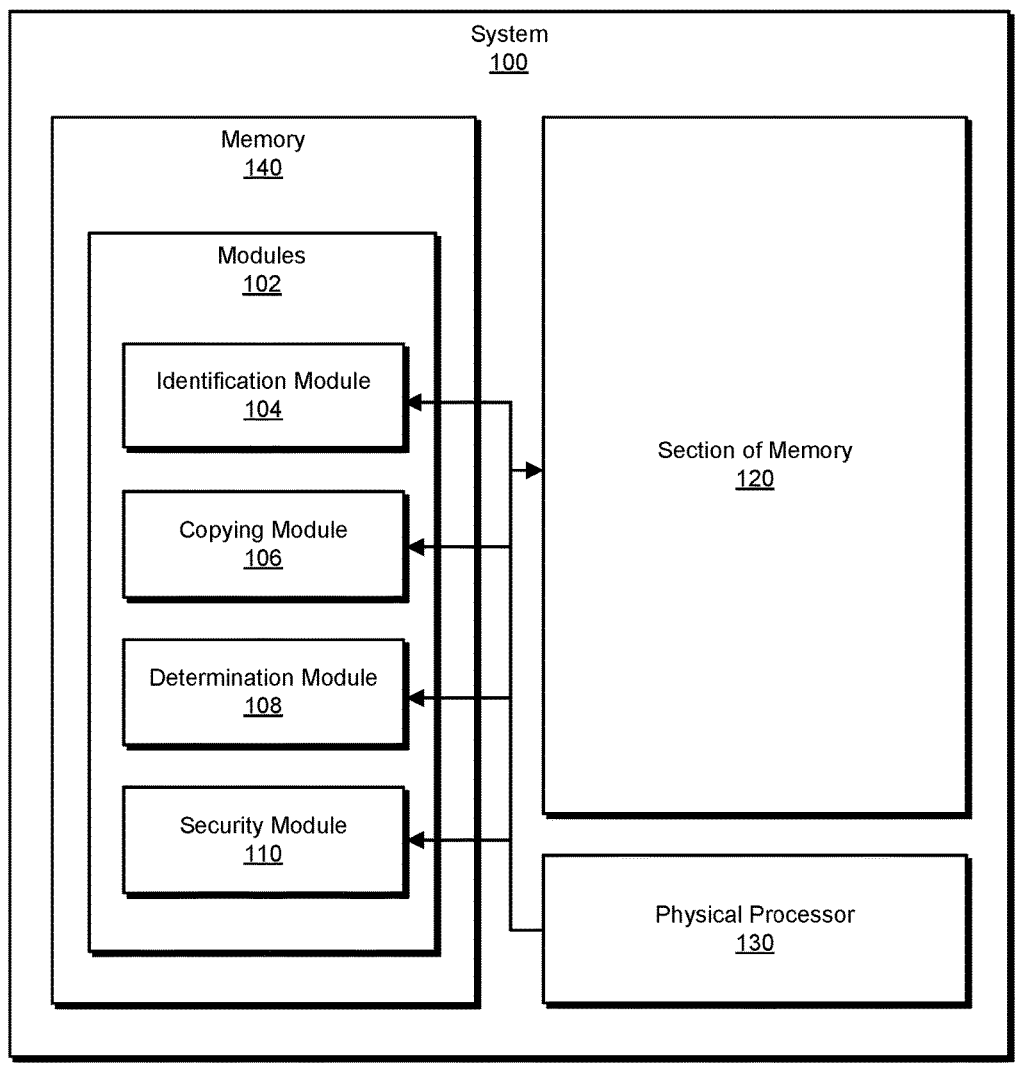
FIG. 1 is a block diagram of an example system for detecting gadgets on computing devices.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for detecting gadgets on computing devices. As will be explained in greater detail below, by identifying each module within a process running on a computing device that does not implement a security protocol (e.g., ASLR) that is incompatible with gadgets, the systems and methods described herein may determine whether a process contains or represents a gadget based on an analysis of only a subset of the process's modules. As such, the disclosed systems and methods may accurately and efficiently detect gadgets running on computing devices that may be maliciously exploited by attackers.

In addition, the systems and methods described herein may improve the functioning of a computing device by preventing attackers from using gadgets to access confidential data within a computing device and/or control or hijack a computing device. These systems and methods may also improve the field of computer security (in particular, the field of exploit prevention) by requiring less storage space and fewer computing resources than traditional security systems to analyze processes for gadget-specific characteristics.

Figure 2:
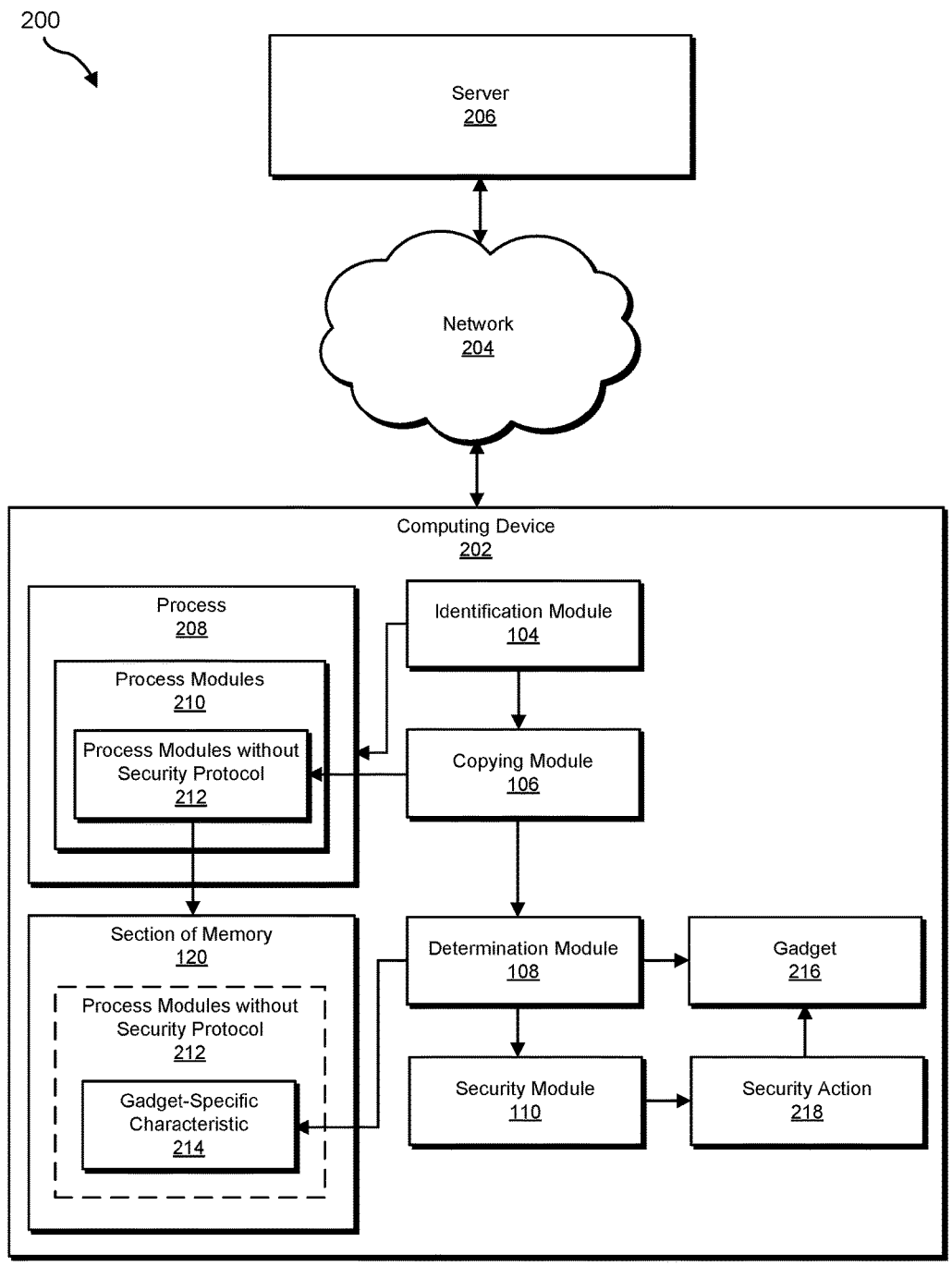
FIG. 2 is a block diagram of an additional example system for detecting gadgets on computing devices.

The following will provide, with reference to FIGS. 1 and 2, detailed descriptions of example systems for detecting gadgets on computing devices. Detailed descriptions of corresponding computer-implemented methods will also be provided in connection with FIG. 3. In addition, detailed descriptions of example modules within processes that implement ASLR will be provided in connection with FIG. 4. Finally, detailed descriptions of an example computing system and network architecture capable of implementing one or more of the embodiments described herein will be provided in connection with FIGS. 5 and 6, respectively.

FIG. 1 is a block diagram of an example system 100 for detecting gadgets on computing devices. As illustrated in this figure, example system 100 may include one or more modules 102 for performing one or more tasks. As will be explained in greater detail below, system 100 may include an identification module 104 that (i) identifies, on a computing device, a process containing multiple modules and (ii) identifies, within the process, each module that does not implement a security protocol that randomizes, each time the module executes, a memory location of at least one portion of data accessed by the module. In addition, system 100 may include a copying module 106 that copies each module that does not implement the security protocol to a section of memory dedicated to security analyses.

System 100 may additionally include a determination module 108 that determines, based on detecting at least one gadget-specific characteristic within at least one copied module, that the process contains a gadget that is capable of being maliciously exploited. Finally, system 100 may include a security module 110 that performs a security action on the computing device to prevent the gadget from being maliciously exploited. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or server 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives, (HDDs), Solid-State Drives (SSDs), optical disk drives, caches, variations or combinations of one or more of the same, and/or any other suitable storage memory.

As illustrated in FIG. 1, example system 100 may also include a section of memory 120. As will be explained in greater detail below, section of memory 120 generally represents any type or form of storage device or medium dedicated to performing security analyses of processes running on computing devices. In some examples, section of memory 120 may represent a dedicated portion of memory 140. In other examples, section of memory 120 may reside outside of memory 140, such as within an alternative section of memory within computing device 202 or a backend security server.

In addition, as illustrated in FIG. 1, example system 100 may include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate detecting gadgets on computing devices. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a server 206 via a network 204. In one example, all or a portion of the functionality of modules 102 may be performed by computing device 202, server 206, and/or any other suitable computing system.

As will be described in greater detail below, one or more of modules 102 from FIG. 1 may, when executed by at least one processor of computing device 202 and/or server 206, enable computing device 202 and/or server 206 to detect gadgets on computing devices. For example, and as will be described in greater detail below, identification module 104 may cause computing device 202 and/or server 206 to (i) identify, on computing device 202, a process 208 that contains process modules 210 and (ii) identify, within process 208, process modules without security protocol 212. Next, copying module 106 may cause computing device 202 and/or server 206 to copy each of process modules without security protocol 212 to section of memory 120. Determination module 108 may then cause computing device 202 and/or server 206 to determine, based on detecting a gadget-specific characteristic 214 within at least one of process modules without security protocol 212, that process 208 contains a gadget 216 capable of being maliciously exploited. Finally, security module 110 may cause computing device 202 and/or server 206 to perform a security action 218 on gadget 216 to prevent gadget 216 from being maliciously exploited.

Computing device 202 generally represents any type or form of computing device capable of reading computer-executable instructions. For example, computing device 202 may represent an endpoint device (e.g., a cellular phone or desktop computer of a user) running client-side security software. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, variations or combinations of one or more of the same, and/or any other suitable computing device.

Server 206 generally represents any type or form of computing device that is capable of analyzing processes running on computing devices for indications that the processes include or represent gadgets. Additional examples of server 206 include, without limitation, security servers, application servers, web servers, storage servers, and/or database servers configured to run certain software applications and/or provide various security, web, storage, and/or database services. Although illustrated as a single entity in FIG. 2, server 206 may include and/or represent a plurality of servers that work and/or operate in conjunction with one another.

Network 204 generally represents any medium or architecture capable of facilitating communication or data transfer. In one example, network 204 may facilitate communication between computing device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
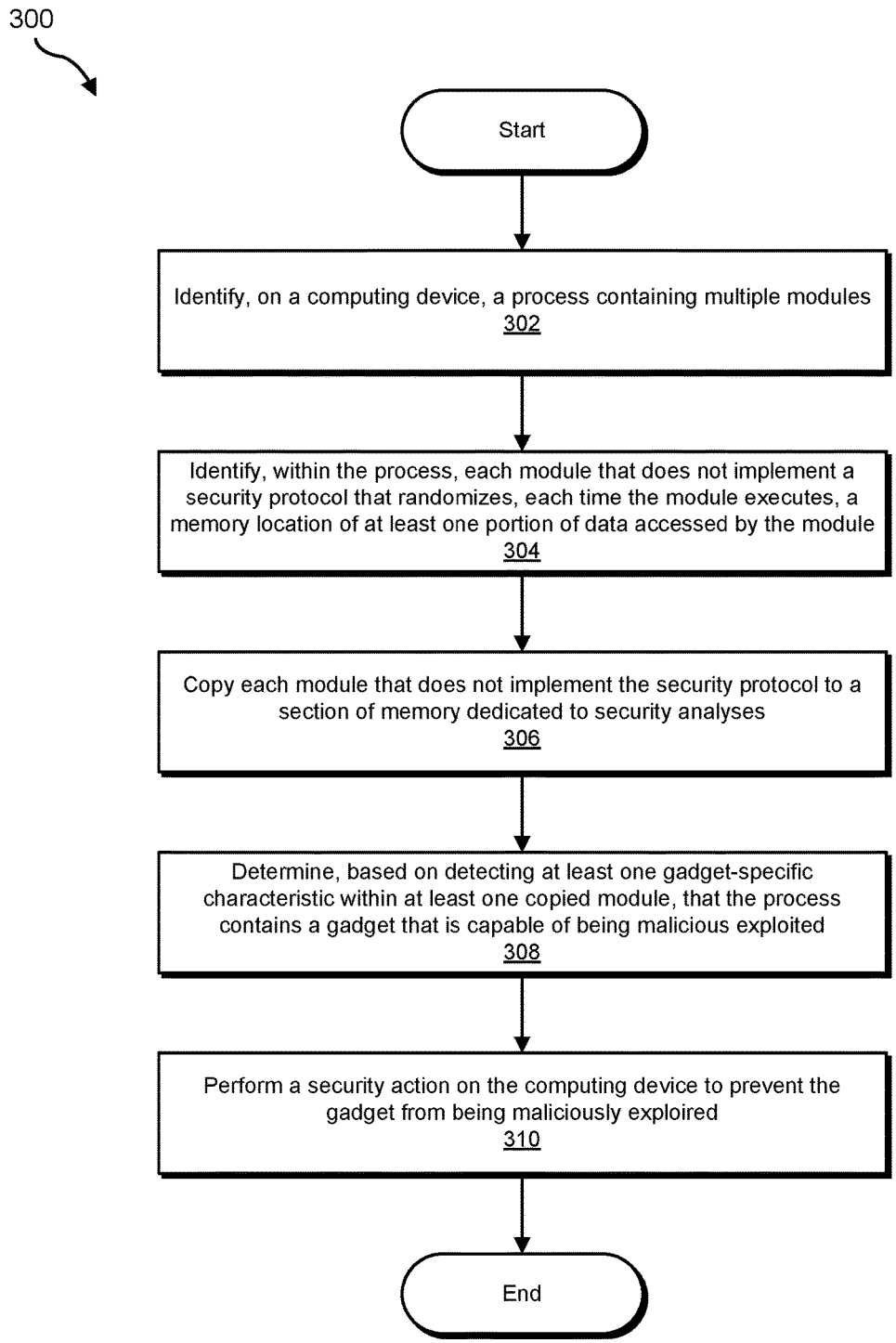
FIG. 3 is a flow diagram of an example method for detecting gadgets on computing devices.

FIG. 3 is a flow diagram of an example computer-implemented method 300 for detecting gadgets on computing devices. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302 one or more of the systems described herein may identify, on a computing device, a process containing multiple modules. For example, identification module 104 may, as part of computing device 202 in FIG. 2, detect process 208 containing process modules 210 on computing device 202.

The term "process," as used herein, generally refers to any type or form of program, application, or portion of executable code that may be executed or operated by a computing device. In some examples, a process may be composed of one or more modules. The term "module," as used herein, generally refers to any portion of code within a process that is separated and/or distinct from other portions of code within the process and may be called or executed independently of the other portions of code. In some embodiments, a process may contain modules of various types, such as executable modules (i.e., modules that contain executable instructions) and modules containing data or information accessed by the executable modules. In addition, as will be explained in greater detail below, a module may include headers that identify configuration information about the module and/or the process that contains the module.

The systems described herein may identify a process running on a computing device in a variety of ways. In some examples, identification module 104 may identify a process immediately after the process begins running on a computing device. For example, identification module 104 may monitor a log that records processes running on a computing device to detect each new process that begins running on the computing device. In such examples, the disclosed systems may perform the security analyses described below on each new process detected on a computing device. As such, the disclosed systems may identify malicious processes (such as maliciously-exploited gadgets) before the malicious processes are able to compromise or harm the computing device.

In other examples, identification module 104 may periodically identify and analyze the processes running on a computing device. For example, the systems described herein may perform, at a predetermined interval and/or at the direction of a user, a security scan on each process currently running on the computing device. In this way, the disclosed systems may protect a computing device from maliciously-exploited processes while conserving computing resources and reducing interruptions to a user's computing activities.

Returning to FIG. 3, at step 304 one or more of the systems described herein may identify, within the process, each module that does not implement a security protocol that randomizes, each time the module executes, a memory location of at least one portion of data accessed by the module. For example, identification module 104 may, as part of computing device 202 in FIG. 2, identify, within process 208, process modules without security protocol 212.

The term "security protocol," as used herein, generally refers to any type or form of procedure, technique, or test incorporated into and/or utilized by a module or portion of code to enhance the safety and/or performance of the module or portion of code. In some examples, a module may implement a security protocol that involves randomizing memory locations of one or more portions of data accessed by the module. In particular, a module that implements ASLR (Address Space Layout Randomization, as explained above) may randomly select, each time the module executes, a memory address in which to load critical data (e.g., libraries) that the module uses to perform one or more tasks. Such a security protocol may protect a process from zero-day exploits (e.g., buffer-overflow and similar attacks) by preventing malicious portions of code (e.g., shellcode injected into the process) from locating and accessing critical portions of data that, if accessed by the malicious code, may allow the malicious code to control or hijack the process.

While security protocols such as ASLR may improve the security and performance of processes and applications, these security protocols may be incompatible with the design, configuration, or operation of some types of processes. In particular, processes (such as processes containing or representing gadgets) that rely on predictable (i.e., not randomized) memory addresses may be unable to implement ASLR.

The term "gadget," as used herein, generally refers to any type or form of lightweight application designed to perform one or more simple functions within a specific computing platform or environment. In particular, gadgets may represent graphical and/or interactive icons incorporated into websites, mobile devices, or desktop computers. Gadgets may provide or encompass a variety of features or services, such as animated clocks, customized alarms, links to applications, up-to-date weather information, etc.

Notably, gadgets (and related applications, such as widgets) may not represent inherent security threats to computing devices. For example, a properly-functioning gadget may enhance a user's experience with their computing device, rather than introducing security or performance deficiencies. However, due at least in part to the inability of gadgets to implement security protocols such as ASLR, gadgets may be vulnerable to potentially harmful attacks and exploits. As such, the disclosed security services may attempt to quickly and accurately identify gadgets running on a computing device to prevent the gadgets from being maliciously exploited.

The systems described herein may identify each module within a process that does not implement a particular security protocol in a variety of ways. In some examples, a module may include a header that indicates one or more configuration or operation details of the module. In particular, the header of a module may indicate any and/or all security protocols implemented within the module. In some embodiments, a security protocol may be identified by a predetermined value in a predetermined location within the header. As such, identification module 104 may determine whether a module implements a security protocol such as ASLR by searching for a particular string or value within the module's header. In some embodiments, in response to detecting a new process running on a computing device, identification module 104 may search a header of each module within the process for such a particular value to determine which modules within the process are suitable candidates for containing or indicating gadgets.

Figure 4:
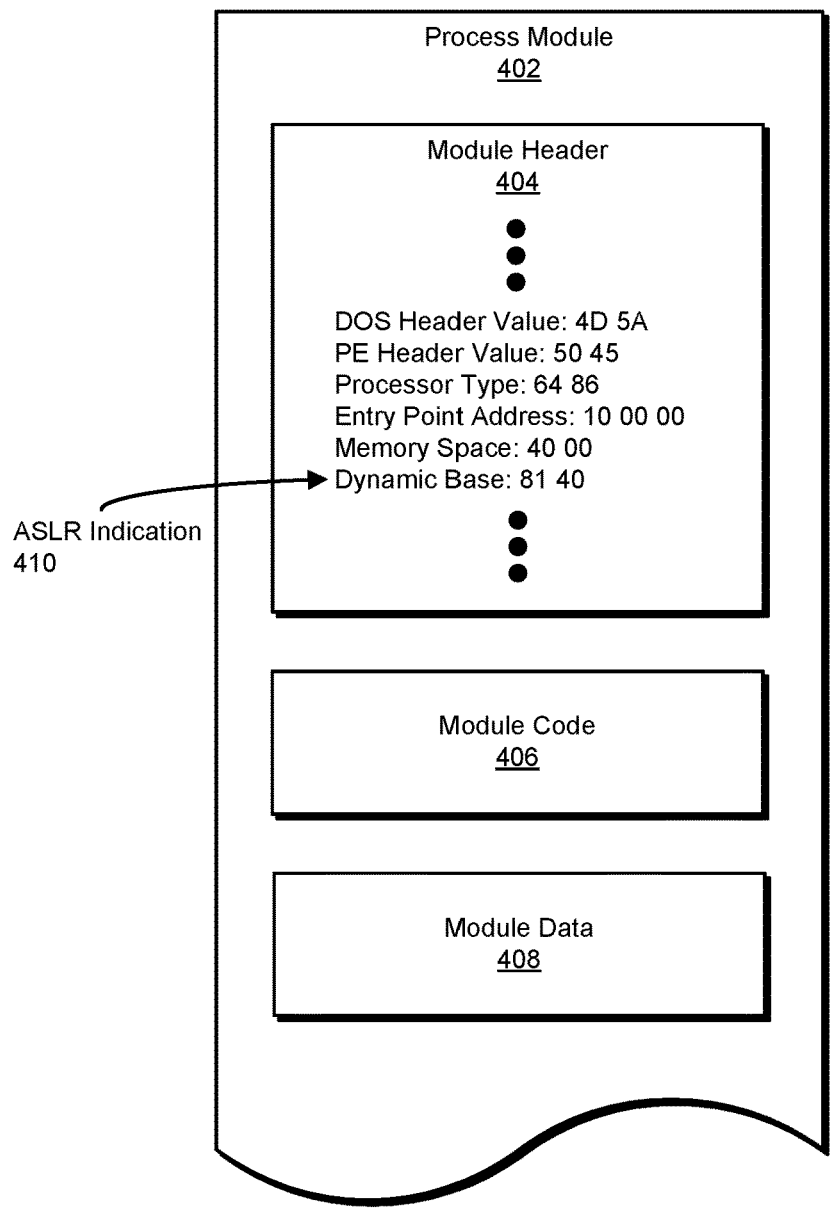
FIG. 4 is an illustration of an example module within a process that implements ASLR.

As an example of the information included within a module, FIG. 4 illustrates a process module 402 that includes a module header 404, module code 406, and module data 408. In this example, module header 404 may contain a string of binary, hexadecimal, or other computer-readable numbers that correspond to or indicate various properties of process module 402. FIG. 4 illustrates a portion of the properties that may be indicated by module header 404. In this example, identification module 104 may determine that process module 402 implements ASLR (i.e., contains an ASLR indication 410) based on identifying the hexadecimal value "81 40" within module header 404. In addition, identification module 104 may determine that the value "4D 5A" within module header 404 indicates that process module 402 is a Disk Operating System (DOS) process, the value "50 45" indicates that process module 402 is of a Portable Executable (PE) format, the value "64 86" describes the processor that executes process module 402, and the value "40 00" indicates an amount of memory required to execute process module 402. Process module 402 may include any additional information, data, or code not illustrated in FIG. 4.

Returning to FIG. 3, at step 306 one or more of the systems described herein may copy each module that does not implement the security protocol to a section of memory dedicated to security analyses. For example, copying module 106 may, as part of computing device 202 in FIG. 2, copy process modules without security protocol 212 to section of memory 120.

The systems described herein may copy each module within a process that does not implement a security protocol to a dedicated section of memory in a variety of ways. In some examples, copying module 106 may copy each selected module to a portion of dedicated memory within the computing device on which an identified process is running. In these examples, the portion of dedicated memory may represent any portion of RAM, hard drive space, or other type of memory within the computing device dedicated to performing the disclosed security services and/or additional security services. In other examples, copying module 106 may copy each selected module to a remote server (e.g., a backend security server) dedicated to performing the disclosed security services.

Notably, because copying module 106 may copy only modules that implement a certain security protocol (rather than each module within a process), the portion of dedicated memory used to analyze the copied modules may be smaller than the amount of memory required for traditional security services (i.e., security technologies that analyze an entire process to determine whether the process is a gadget). Furthermore, in some embodiments, the disclosed systems may temporarily postpone or pause a process while copying and analyzing selected modules within the process to prevent a maliciously-exploited process from harming a computing device.

Returning to FIG. 3, at step 308 one or more of the systems described herein may determine, based on detecting at least one gadget-specific characteristic within at least one copied module, that the process contains a gadget that is capable of being maliciously exploited. For example, determination module 108 may, as part of computing device 202 in FIG. 2, determine, based on detecting gadget-specific characteristic 214 within at least one of process modules without security protocol 212, that process 208 contains gadget 216.

The term "gadget-specific characteristic," as used herein, generally refers to any type or form of property or signal within a process or module that indicates, solely or in combination with additional characteristics, that the process or module may be a part of or involved in executing a gadget. Examples of gadget-specific characteristics include, without limitation, module or file types associated with gadgets, module sizes associated with gadgets, module or process developers associated with gadgets, and particular executable instructions associated with gadgets.

The systems described herein may determine whether a process is a gadget based on gadget-specific characteristics within the modules of the process in a variety of ways. In some examples, determination module 108 may identify and record each gadget-specific characteristic within each module of a process that was copied to a dedicated portion of memory for analysis (i.e., each module that was determined to implement ASLR). Determination module 108 may then determine whether any single identified characteristic or combination of characteristics within the modules indicates that the process includes or represents a gadget.

In particular, determination module 108 may determine that a process is a gadget based on determining whether any copied module is an executable. Determination module 108 may determine that a copied module is an executable in a variety of ways, such as by identifying or analyzing executable instructions within the module and/or identifying a predetermined value corresponding to an executable within a header of the module. In these examples, determination module 108 may determine that a module that is both an executable and does not implement a security protocol such as ASLR is likely to be contained within a gadget.

Determination module 108 may determine that a module is indicative of a gadget based on identifying any additional or alternative gadget-specific characteristic within the module. Notably, because determination module 108 may analyze a subset of modules within a process (rather than each module within the process), determination module 108 may determine whether the process is a gadget more quickly and efficiently than traditional security services.

Returning to FIG. 3, at step 310 one or more of the systems described herein may perform a security action on the computing device to prevent the gadget from being maliciously exploited. For example, security module 110 may, as part of computing device 202 in FIG. 2, perform security action 218 on gadget 216 to prevent gadget 216 from being maliciously exploited.

The systems described herein may perform a security action to prevent a gadget from being maliciously exploited in a variety of ways. In some examples, security module 110 may terminate a process that determination module 108 determined to include or represent a gadget. As such, security module 110 may prevent malicious shellcode that has been injected into the process from being executed (or may prevent an attacker from injecting malicious shellcode at a later point in time). In other examples, security module 110 may perform an additional security analysis of a process running a gadget (i.e., a more in-depth analysis of the process's executable instructions) to determine whether the process has been infected with malicious shellcode.

In further examples, security module 110 may permit a gadget to run on a computing device while monitoring the gadget for indications that the gadget has been maliciously exploited. For example, after determining that a process is a gadget, security module 110 may allocate additional resources to monitor the running process to detect any suspicious or harmful behaviors performed by the process. In this way, security module 110 may allow a computing device to operate gadgets that may enhance a user's computing experience, while still providing protection from maliciously-exploited gadgets.

As explained above in connection with FIG. 3, an exploit-prevention and/or gadget-detection technology may identify gadgets running on computing devices. For example, after determining that a computing device has begun executing a process, a gadget-detection technology may identify each module within the process capable of supporting or running a gadget (e.g., each module that does not implement ASLR or a similar security protocol). The gadget-detection technology may then copy each identified module to a section of memory within the computing device that is dedicated to security analyses. Next, the gadget-detection technology may analyze each copied module (rather than all of the modules within the process) for gadget-specific characteristics. For example, the gadget-detection technology may determine whether any module that does not implement ASLR is also an executable. In the event that the gadget-detection technology detects one or more gadget-specific characteristics within the copied modules, the technology may determine that the process containing the module is a gadget. In response, the gadget-detection technology may perform one or more security actions to prevent an attacker from maliciously exploiting the gadget on the computing device, thereby improving the security state and performance of the computing device.

Figure 5:
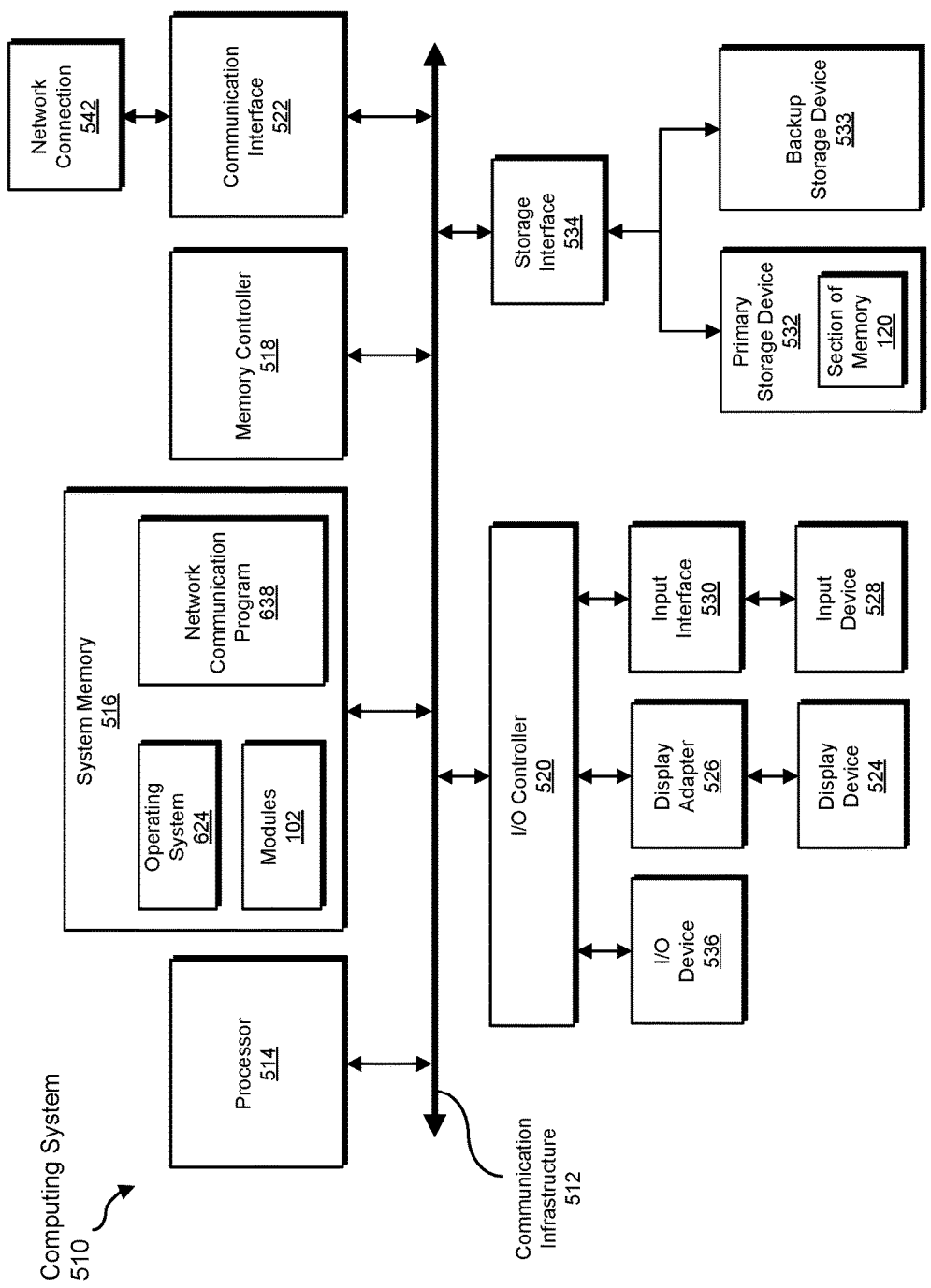
FIG. 5 is a block diagram of an example computing system capable of implementing one or more of the embodiments described and/or illustrated herein.

FIG. 5 is a block diagram of an example computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of physical processing unit (e.g., a hardware-implemented central processing unit) capable of processing data or interpreting and executing instructions. In certain embodiments, processor 514 may receive instructions from a software application or module. These instructions may cause processor 514 to perform the functions of one or more of the example embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In some examples, system memory 516 may store and/or load an operating system 524 for execution by processor 514. In one example, operating system 524 may include and/or represent software that manages computer hardware and software resources and/or provides common services to computer programs and/or applications on computing system 510. Examples of operating system 624 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

As illustrated in FIG. 5, computing system 510 may also include at least one display device 524 coupled to I/O controller 520 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, example computing system 510 may also include at least one input device 528 coupled to I/O controller 520 via an input interface 530. Input device 528 generally represents any type or form of input device capable of providing input, either computer or human generated, to example computing system 510. Examples of input device 528 include, without limitation, a keyboard, a pointing device, a speech recognition device, variations or combinations of one or more of the same, and/or any other input device.

Additionally or alternatively, example computing system 510 may include additional I/O devices. For example, example computing system 510 may include I/O device 536. In this example, I/O device 536 may include and/or represent a user interface that facilitates human interaction with computing system 510. Examples of I/O device 536 include, without limitation, a computer mouse, a keyboard, a monitor, a printer, a modem, a camera, a scanner, a microphone, a touchscreen device, variations or combinations of one or more of the same, and/or any other I/O device.

Communication interface 522 broadly represents any type or form of communication device or adapter capable of facilitating communication between example computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

In some examples, system memory 516 may store and/or load a network communication program 538 for execution by processor 514. In one example, network communication program 538 may include and/or represent software that enables computing system 510 to establish a network connection 542 with another computing system (not illustrated in FIG. 5) and/or communicate with the other computing system by way of communication interface 522. In this example, network communication program 538 may direct the flow of outgoing traffic that is sent to the other computing system via network connection 542. Additionally or alternatively, network communication program 538 may direct the processing of incoming traffic that is received from the other computing system via network connection 542 in connection with processor 514.

Although not illustrated in this way in FIG. 5, network communication program 538 may alternatively be stored and/or loaded in communication interface 522. For example, network communication program 538 may include and/or represent at least a portion of software and/or firmware that is executed by a processor and/or Application Specific Integrated Circuit (ASIC) incorporated in communication interface 522.

As illustrated in FIG. 5, example computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510. In one example, section of memory 120 from FIG. 1 may be stored and/or loaded in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 510 may be configured as an Application Specific Integrated Circuit (ASIC) adapted to implement one or more of the example embodiments disclosed herein.

Figure 6:
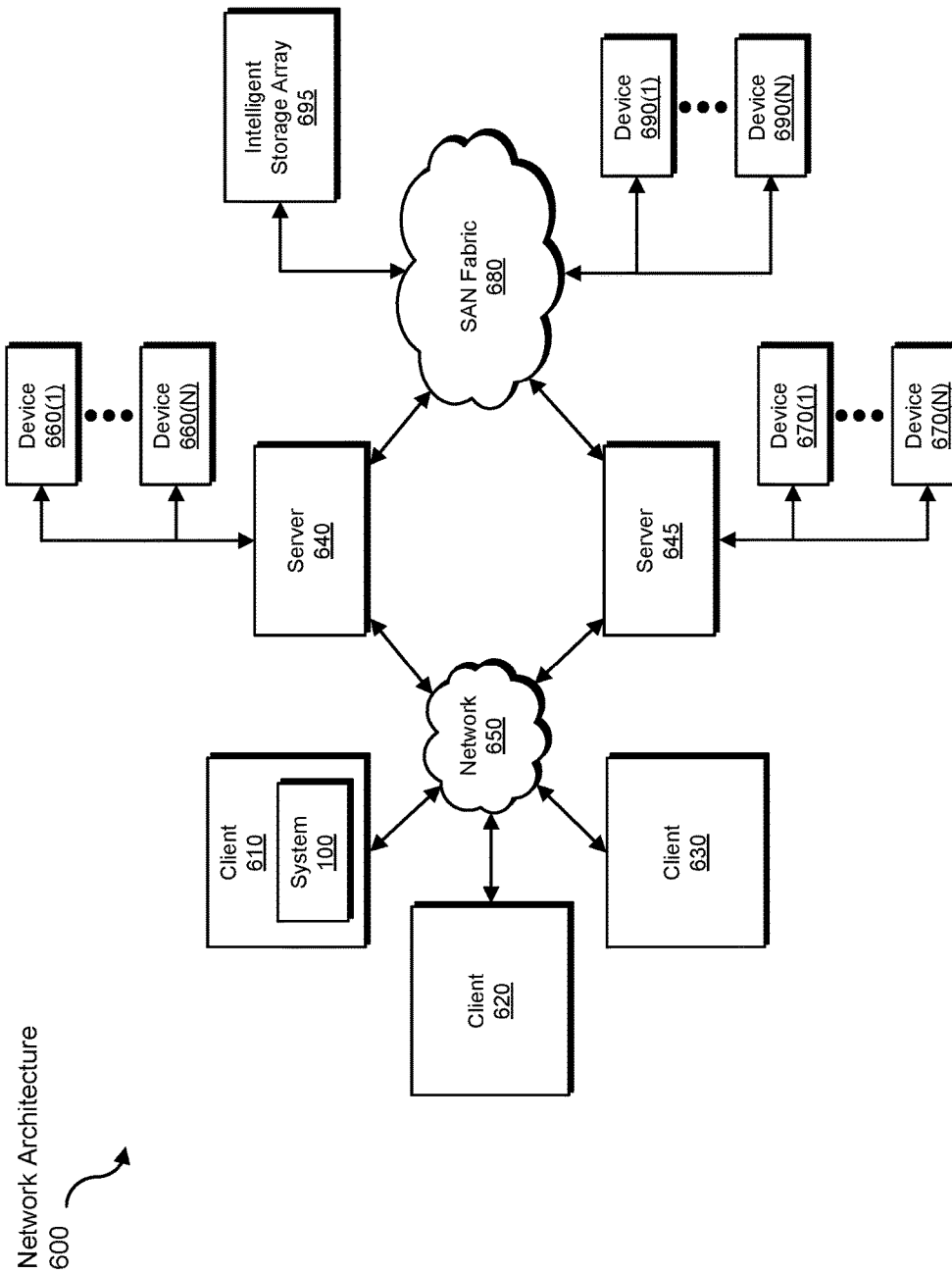
FIG. 6 is a block diagram of an example computing network capable of implementing one or more of the embodiments described and/or illustrated herein.

FIG. 6 is a block diagram of an example network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as example computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to example computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the example embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an example method for detecting gadgets on computing devices.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive a process containing multiple modules, transform the modules into a determination that the process is a gadget, output a result of the transformation to a computing device running the gadget, use the result of the transformation to prevent the gadget from being maliciously exploited, and store the result of the transformation in a server or database. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for detecting gadgets on computing devices, at least a portion of the method being performed by a computing device comprising at least one processor, the method comprising:

identifying, on the computing device, a process comprising a plurality of modules;

identifying, within the process, each module that does not implement a security protocol that randomizes, each time the module executes, a memory location of at least one portion of data accessed by the module;

copying each module that does not implement the security protocol to a section of memory dedicated to security analyses;

determining, based on detecting at least one gadget-specific characteristic within at least one copied module, that the process comprises a gadget that is capable of being maliciously exploited; and performing a security action on the computing device to prevent the gadget from being maliciously exploited.

2. The method of claim 1, wherein identifying the process on the computing device comprises identifying a process currently running on the computing device.

3. The method of claim 1, wherein identifying each module that does not implement the security protocol comprises identifying each module that does not implement address space layout randomization.

4. The method of claim 3, wherein identifying each module that does not implement address space layout randomization comprises identifying each module that does not contain, within a header of the module, a predetermined value that indicates the module implements address space layout randomization.

5. The method of claim 1, wherein the section of memory dedicated to security analyses comprises a dedicated section of memory within the computing device.

6. The method of claim 1, wherein:

detecting the gadget-specific characteristic within the copied module comprises determining that the module contains executable instructions; and determining that the process comprises the gadget comprises determining that the copied module both does not implement the security protocol and contains the executable instructions.

7. The method of claim 1, wherein performing the security action on the computing device comprises terminating the process.

8. The method of claim 1, wherein performing the security action on the computing device comprises monitoring the gadget while the gadget runs on the computing device to detect an indication that the gadget is being maliciously exploited.

9. A system for detecting gadgets on computing devices, the system comprising:

an identification module, stored in memory, that:
identifies, on a computing device, a process comprising a plurality of modules; and
identifies, within the process, each module that does not implement a security protocol that randomizes, each time the module executes, a memory location of at least one portion of data accessed by the module;

a copying module, stored in memory, that copies each module that does not implement the security protocol to a section of memory dedicated to security analyses;

a determination module, stored in memory, that determines, based on detecting at least one gadget-specific characteristic within at least one copied module, that the process comprises a gadget that is capable of being maliciously exploited;

a security module, stored in memory, that performs a security action on the computing device to prevent the gadget from being maliciously exploited; and at least one physical processor configured to execute the identification module, the copying module, the determination module, and the security module.

10. The system of claim 9, wherein the identification module identifies the process on the computing device by identifying a process currently running on the computing device.

11. The system of claim 9, wherein the identification module identifies each module that does not implement the security protocol by identifying each module that does not implement address space layout randomization.

12. The system of claim 11, wherein the identification module identifies each module that does not implement address space layout randomization by identifying each module that does not contain, within a header of the module, a predetermined value that indicates the module implements address space layout randomization.

13. The system of claim 9, wherein the section of memory dedicated to security analyses comprises a dedicated section of memory within the computing device.

14. The system of claim 9, wherein the determination module:
   detects the gadget-specific characteristic within the copied module by determining that the module contains executable instructions; and
   determines that the process comprises the gadget by determining that the copied module both does not implement the security protocol and contains the executable instructions.

15. The system of claim 9, wherein the security module performs the security action on the computing device by terminating the process.

16. The system of claim 9, wherein the security module performs the security action on the computing device by monitoring the gadget while the gadget runs on the computing device to detect an indication that the gadget is being maliciously exploited.

17. A non-transitory computer-readable medium comprising one or more computer-executable instructions that, when executed by at least one processor of a computing device, cause the computing device to:
   identify, on the computing device, a process comprising a plurality of modules;
   identify, within the process, each module that does not implement a security protocol that randomizes, each time the module executes, a memory location of at least one portion of data accessed by the module;
   copy each module that does not implement the security protocol to a section of memory dedicated to security analyses;
   determine, based on detecting at least one gadget-specific characteristic within at least one copied module, that the process comprises a gadget that is capable of being maliciously exploited; and
   perform a security action on the computing device to prevent the gadget from being maliciously exploited.

18. The computer-readable medium of claim 17, wherein the one or more computer-executable instructions cause the computing device to identify the process on the computing device by identifying a process currently running on the computing device.

19. The computer-readable medium of claim 17, wherein the one or more computer-executable instructions cause the computing device to identify each module that does not implement the security protocol by identifying each module that does not implement address space layout randomization.

20. The computer-readable medium of claim 17, wherein the one or more computer-executable instructions cause the computing device to identify each module that does not implement address space layout randomization by identifying each module that does not contain, within a header of the module, a predetermined value that indicates the module implements address space layout randomization.

* * * * *